(12) United States Patent
Zhang et al.

(10) Patent No.: US 10,134,349 B2
(45) Date of Patent: Nov. 20, 2018

(54) DISPLAY INTERFERENCE MITIGATION SYSTEMS AND METHODS

(71) Applicant: Apple Inc., Cupertino, CA (US)

(72) Inventors: Rui Zhang, Santa Clara, CA (US); Guangmao Xing, San Jose, CA (US); Paolo Sacchetto, Cupertino, CA (US); Marc Joseph Devincentis, Palo Alto, CA (US); Anshi Liang, San Jose, CA (US); Weijun Yao, San Jose, CA (US); Sang Y. Youn, Cupertino, CA (US); Hyunwoo Nho, Stanford, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/498,287

(22) Filed: Apr. 26, 2017

(65) Prior Publication Data

US 2018/0158386 A1     Jun. 7, 2018

Related U.S. Application Data

(60) Provisional application No. 62/429,686, filed on Dec. 2, 2016.

(51) Int. Cl.
*G09G 3/36* (2006.01)
*G09G 3/3225* (2016.01)
(Continued)

(52) U.S. Cl.
CPC ............. *G09G 3/3648* (2013.01); *G09G 3/20* (2013.01); *G09G 3/3225* (2013.01); *H04B 1/10* (2013.01);
(Continued)

(58) Field of Classification Search
CPC ...... G09G 3/3648; G09G 3/3225; G09G 3/20; G09G 2320/043; G09G 2340/0435;
(Continued)

(56) References Cited

U.S. PATENT DOCUMENTS

| 5,742,356 A | 4/1998 | Suzuki |
| 6,097,444 A | 8/2000 | Nakano |

(Continued)

FOREIGN PATENT DOCUMENTS

EP     1863279 A2     12/2007

OTHER PUBLICATIONS

Invitation to Pay Additional Fees from International Application No. PCT/US2017/054981, dated Jan. 16, 2018, 17 pages.

*Primary Examiner* — Patrick F Marinelli
(74) *Attorney, Agent, or Firm* — Morgan, Lewis & Bockius LLP

(57) ABSTRACT

Aspects of the subject technology relate to electronic devices with displays. A display may include an array of display pixels and control circuitry for operating the display. In some scenarios, interference signals from other components of the electronic device or additional external devices can couple to the control circuitry for the display and cause distortions in displayed data. Display frames may be displayed by an electronic device display with a varying phase. The varying phase display frames may each include a distortion pattern that also varies from frame to frame due to the varying phase. The varying distortion patterns may average out or visibly cancel when viewed by a user such that no visible artifact of the interference signal is seen by the user. The varying phase can be actively tuned to the interference signal if desired.

11 Claims, 12 Drawing Sheets

(51) Int. Cl.
*H04B 1/10* (2006.01)
*G09G 3/20* (2006.01)

(52) U.S. Cl.
CPC ... *G09G 2310/061* (2013.01); *G09G 2310/08* (2013.01); *G09G 2320/043* (2013.01); *G09G 2330/06* (2013.01); *G09G 2340/0435* (2013.01); *G09G 2370/16* (2013.01); *H04B 2215/064* (2013.01)

(58) Field of Classification Search
CPC ......... G09G 2310/061; G09G 2370/16; G09G 2330/06; G09G 2310/08; H04B 1/10; H04B 2215/064
See application file for complete search history.

(56) References Cited

U.S. PATENT DOCUMENTS

| | | | |
|---|---|---|---|
| 7,212,178 B2 | 5/2007 | Ishii et al. | |
| 7,289,161 B2* | 10/2007 | Yamakawa | G09G 3/3611 345/611 |
| 7,384,158 B2 | 6/2008 | Ramachandran et al. | |
| 7,782,396 B2* | 8/2010 | Haneda | H04N 7/0105 348/222.1 |
| 8,654,083 B2 | 2/2014 | Hotelling et al. | |
| 8,907,921 B2 | 12/2014 | Reynolds | |
| 9,378,672 B2* | 6/2016 | Chong | G09G 3/3208 |
| 9,418,626 B2 | 8/2016 | Reynolds | |
| 9,613,556 B2* | 4/2017 | Lin | G09G 3/20 |
| 9,880,649 B2* | 1/2018 | Agarwal | G06F 3/0412 |
| 2004/0145596 A1* | 7/2004 | Yamakawa | G09G 3/3611 345/690 |
| 2007/0070212 A1* | 3/2007 | Haneda | H04N 5/232 348/222.1 |
| 2008/0165180 A1* | 7/2008 | Lee | G09G 3/3648 345/214 |
| 2009/0102854 A1* | 4/2009 | Lai | G09G 3/20 345/589 |
| 2010/0141613 A1 | 6/2010 | Sonobe | |
| 2010/0149413 A1 | 6/2010 | Kumakawa | |
| 2012/0207205 A1* | 8/2012 | Zhao | H05B 33/0827 375/238 |
| 2013/0236051 A1* | 9/2013 | Chen | G06F 3/042 382/103 |
| 2013/0321364 A1* | 12/2013 | Chong | G09G 3/3208 345/204 |
| 2014/0192679 A1* | 7/2014 | Logvinov | H04B 3/544 370/254 |
| 2014/0225817 A1 | 8/2014 | Huang et al. | |
| 2015/0138050 A1* | 5/2015 | Kim | G09G 3/3233 345/76 |
| 2015/0207493 A1 | 7/2015 | Han et al. | |
| 2016/0063907 A1* | 3/2016 | Lin | G09G 3/20 345/204 |
| 2016/0065890 A1 | 3/2016 | Miura et al. | |
| 2016/0379542 A1* | 12/2016 | Whangbo | G09G 3/2022 345/691 |
| 2017/0092210 A1* | 3/2017 | Tann | G09G 3/3614 |
| 2018/0103231 A1* | 4/2018 | Ahn | G09G 5/005 |
| 2018/0158386 A1* | 6/2018 | Zhang | G06T 1/20 |

* cited by examiner

DISPLAY INTERFERENCE MITIGATION SYSTEMS AND METHODS

CROSS REFERENCE TO RELATED APPLICATIONS

The present application claims the benefit of priority under 35 U.S.C. § 119 as a non-provisional of U.S. Provisional Patent Application Ser. No. 62/429,686 entitled "DISPLAY INTERFERENCE MITIGATION SYSTEMS AND METHODS" and filed on Dec. 2, 2016, the disclosure of which is hereby incorporated by reference in its entirety for all purposes.

TECHNICAL FIELD

The present description relates generally to electronic devices with displays, and more particularly, but not exclusively, to interference mitigation for electronic device displays.

BACKGROUND

Electronic devices such as computers, media players, cellular telephones, set-top boxes, and other electronic equipment are often provided with displays for displaying visual information. Displays such as organic light-emitting diode (OLED) displays and liquid crystal displays (LCDs) typically include an array of display pixels arranged in pixel rows and pixel columns. Display control circuitry coupled to the array of display pixels typically receives data for display from system control circuitry of the electronic device and, based on the data for display, generates and provides control signals to the array of display pixels. However, in some scenarios, electromagnetic interference from other modules within the electronic device or from external devices can cause undesirable visible artifacts during operation of the electronic device display.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
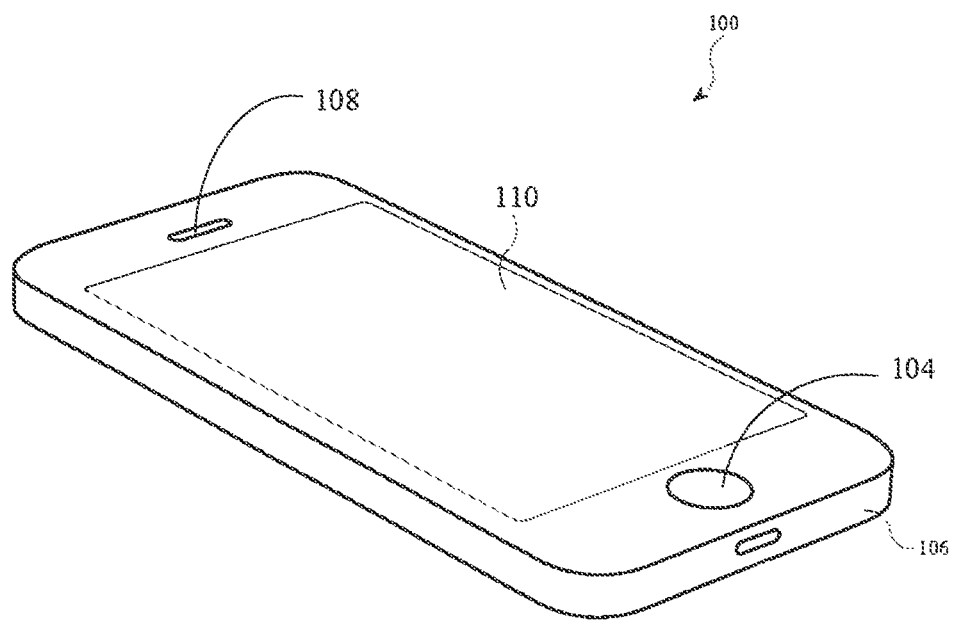
FIG. 1 illustrates a perspective view of an example electronic device implemented as a cellular telephone having a display in accordance with various aspects of the subject technology.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

The subject disclosure provides electronic devices such as cellular telephones, media players, computers, wearable computing devices, set-top boxes, wireless access points, and other electronic equipment that may include displays. Displays may be used to present visual information and status data and/or may be used to gather user input data. A display may include an array of display pixels. Each display pixel may include one or more colored subpixels for displaying color images.

For example, an electronic device may include a display having an array of display pixels. Each display pixel may include a pixel circuit having components such as thin-film transistors (TFTs) that are operable to control a light-emitting component such as an organic light-emitting diode (OLED) or other light-control components such as a portion of a liquid crystal layer of a display that controls passage of light from a backlight for the display.

Both OLED displays and liquid crystal displays (LCDs) can be sensitive to leaked interference from co-existing sub-systems within a common electronic device (e.g., disposed in a common electronic device housing) and/or from an external device such as a wireless charger. For example, displays can be particularly sensitive to other device modules or external devices that operate at an operating frequency that is the same as or near to one or more harmonic frequencies of a display data line refresh rate for the display. For example, interference signals can be inductively or capacitively coupled to display control circuitry such as display data lines, gate lines, or other display circuitry components, which may generate a distortion pattern in a displayed frame that can be visible to a user.

Interfering components in a common device with a display can include, as examples, touch-sensitive components, other display components, wireless network (e.g., WiFi®) components, near-field communications (e.g., Bluetooth) components, power supply components, and wireless charging components. Each interfering component may have a preferred operating frequency. In some implementations, the operating frequencies of various device components are chosen at non-interfering frequencies. However, as devices incorporate more and more features and related operating components and interact with more and more external devices in the surrounding area, it can be difficult to prevent visible interference with a device display merely by selecting operating frequencies of various components and devices.

In accordance with various aspects of the subject disclosure, a display of an electronic device and/or one or more internal or external interfering devices may be operated using a modified timing that prevents and/or mitigates visible artifacts on the display caused by operation of the interfering device. For example, as described in further detail hereinafter, the display may be operated using a phase changing refresh rate, phase changes may be applied to the operating frequency of the interfering device, and/or the interfering device may be operated at times during which interference with display operations are unlikely or reduced.

An illustrative electronic device having a display is shown in FIG. 1. In the example of FIG. 1, device 100 has been implemented using a housing that is sufficiently small to fit within a user's hand (e.g., device 100 of FIG. 1 may be a handheld electronic device such as a cellular telephone). As shown in FIG. 1, device 100 includes a display such as display 110 mounted on the front of housing 106. Display 110 may be substantially filled with active display pixels or may have an active portion and an inactive portion. Display 110 may have openings (e.g., openings in the inactive or active portions of display 110) such as an opening to accommodate button 104 and an opening to accommodate speaker port 108.

Display 110 may be a touch screen that incorporates capacitive touch electrodes or other touch sensor components or may be a display that is not touch-sensitive. Display 110 includes display pixels. The display pixels may be formed from light-emitting diodes (LEDs), organic light-emitting diodes (OLEDs), plasma cells, electrophoretic display elements, electrowetting display elements, liquid crystal display (LCD) components, or other suitable display pixel structures. Arrangements in which display 110 is formed using organic light-emitting diode pixels and liquid crystal display pixels are sometimes described herein as an example. This is, however, merely illustrative. In various implementations, any suitable type of display technology may be used in forming display 110, if desired.

Housing 106, which may sometimes be referred to as a case, may be formed of plastic, glass, ceramics, fiber composites, metal (e.g., stainless steel, aluminum, etc.), other suitable materials, or a combination of any two or more of these materials.

The configuration of electronic device 100 of FIG. 1 is merely illustrative. In other implementations, electronic device 100 may be a computer such as a computer that is integrated into a display such as a computer monitor, a laptop computer, a tablet computer, a somewhat smaller portable device such as a wrist-watch device, pendant device, or other wearable or miniature device, a media player, a gaming device, a navigation device, a computer monitor, a television, or other electronic equipment.

Figure 2:
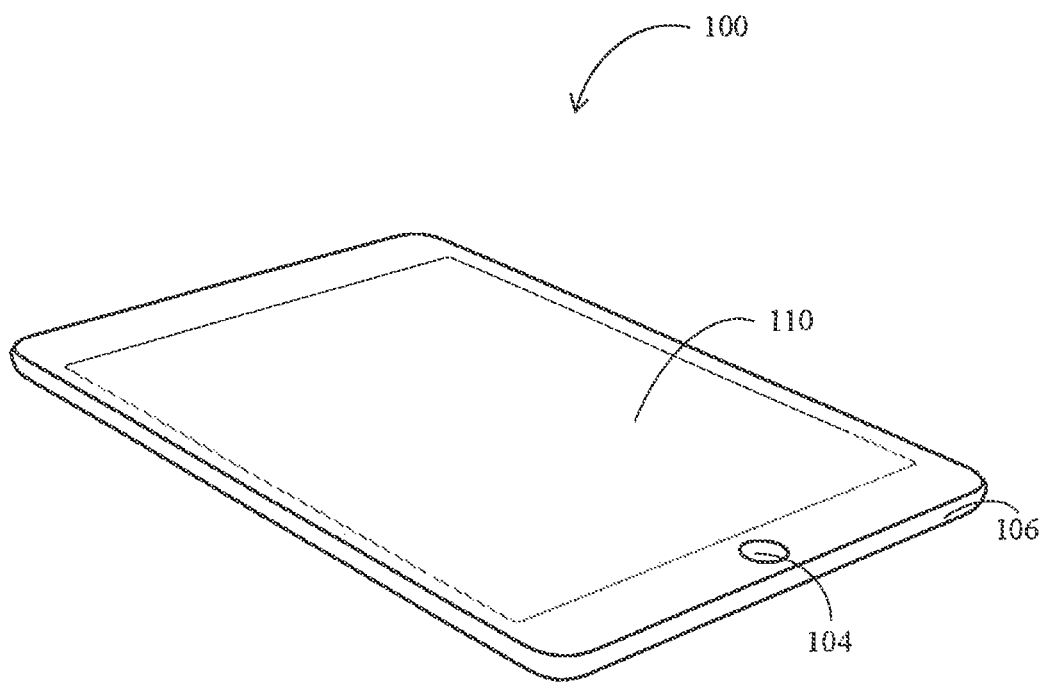
FIG. 2 illustrates a perspective view of an example electronic device implemented as a tablet computer having a display in accordance with various aspects of the subject technology.

For example, FIG. 2 is a perspective view of electronic device 100 in a configuration in which electronic device 100 has been implemented in the form of a tablet computer. In the example of FIG. 2, display 110 is mounted on the upper (front) surface of housing 106. An opening may be formed in display 110 to accommodate button 104.

Figure 3:
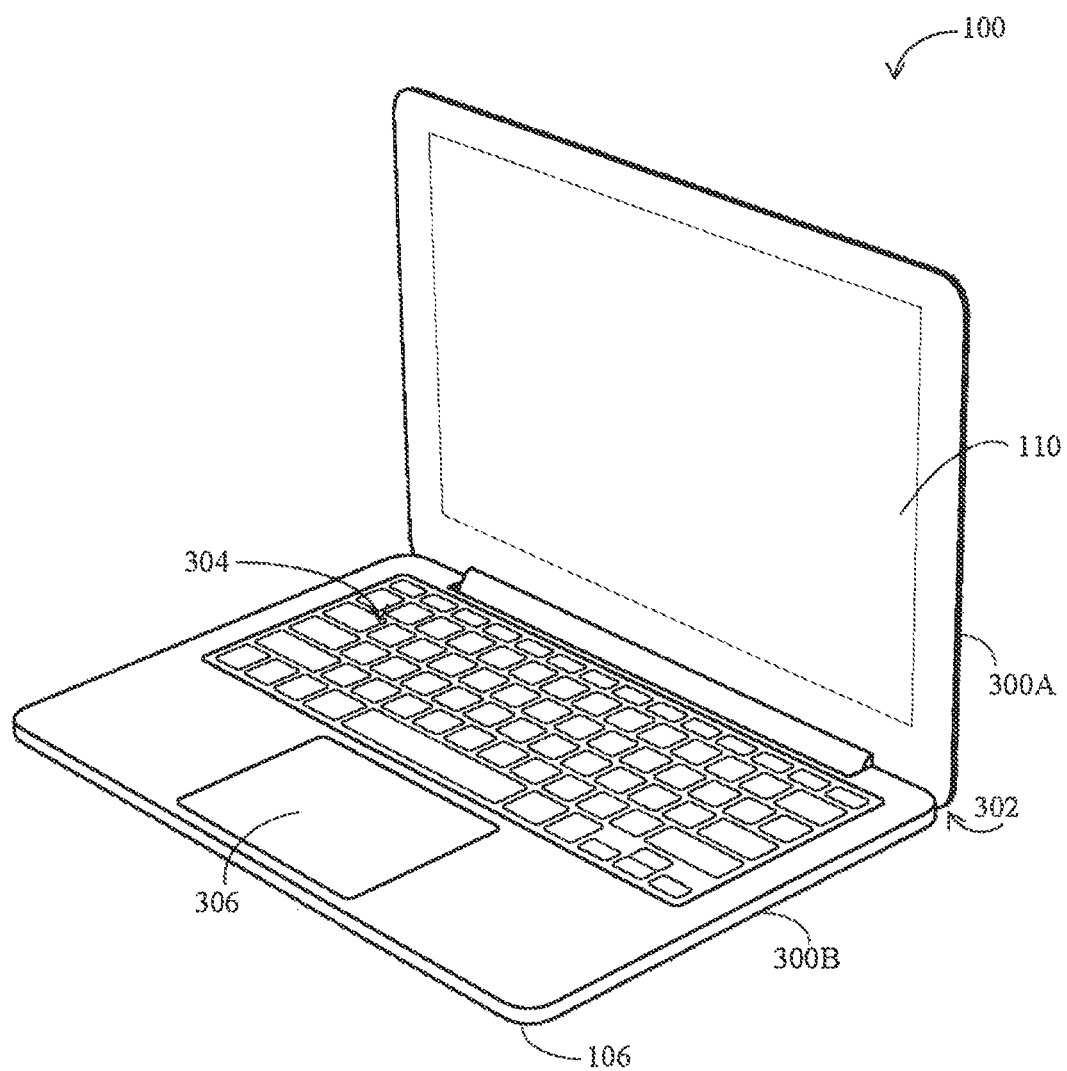
FIG. 3 illustrates a perspective view of an example electronic device implemented as a portable computer having a display in accordance with various aspects of the subject technology.

As another example, FIG. 3 is a perspective view of electronic device 100 in a configuration in which electronic device 100 has been implemented in the form of a portable computer. In the example of FIG. 3, housing 106 may be formed using a unibody configuration in which some or all of housing 106 is machined or molded as a single structure or may be formed using multiple structures (e.g., an internal frame structure, one or more structures that form exterior housing surfaces, etc.).

As shown in FIG. 3, housing 106 may have multiple parts. For example, housing 106 may have upper portion 300A and lower portion 300B. Upper portion 300A may be coupled to lower portion 300B using a hinge that allows portion 300A to rotate about rotational axis 302 relative to portion 300B. A keyboard such as keyboard 304 and a touch pad such as touch pad 306 may be mounted in lower housing portion 302B, in some implementations.

Figure 4:
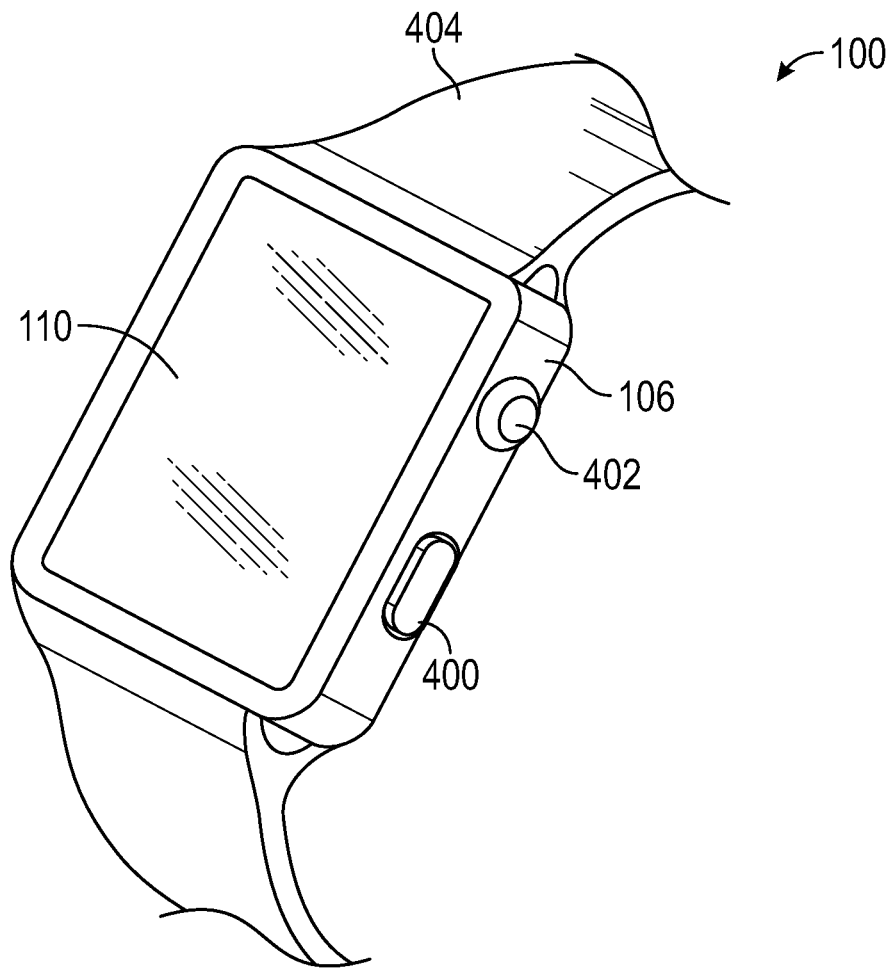
FIG. 4 illustrates a perspective view of an example electronic device implemented as a wearable device having a display in accordance with various aspects of the subject technology.

FIG. 4 is a perspective view of electronic device 100 in a configuration in which electronic device 100 has been implemented in the form of a wearable device such as wristwatch device. In the example of FIG. 4, display 110 is mounted on a front surface of housing 106. Housing 106 may include one or more openings, such as sidewall openings in which one or more corresponding input/output components are disposed. In the example of FIG. 4, a compressible side button 400 and a compressible/rotatable crown button 402 are provided by which a user can operate device 100. Strap 404 may be coupled to housing 106 and arranged to secure device 100 to a part of a user's body such as around the user's wrist.

Figure 5:
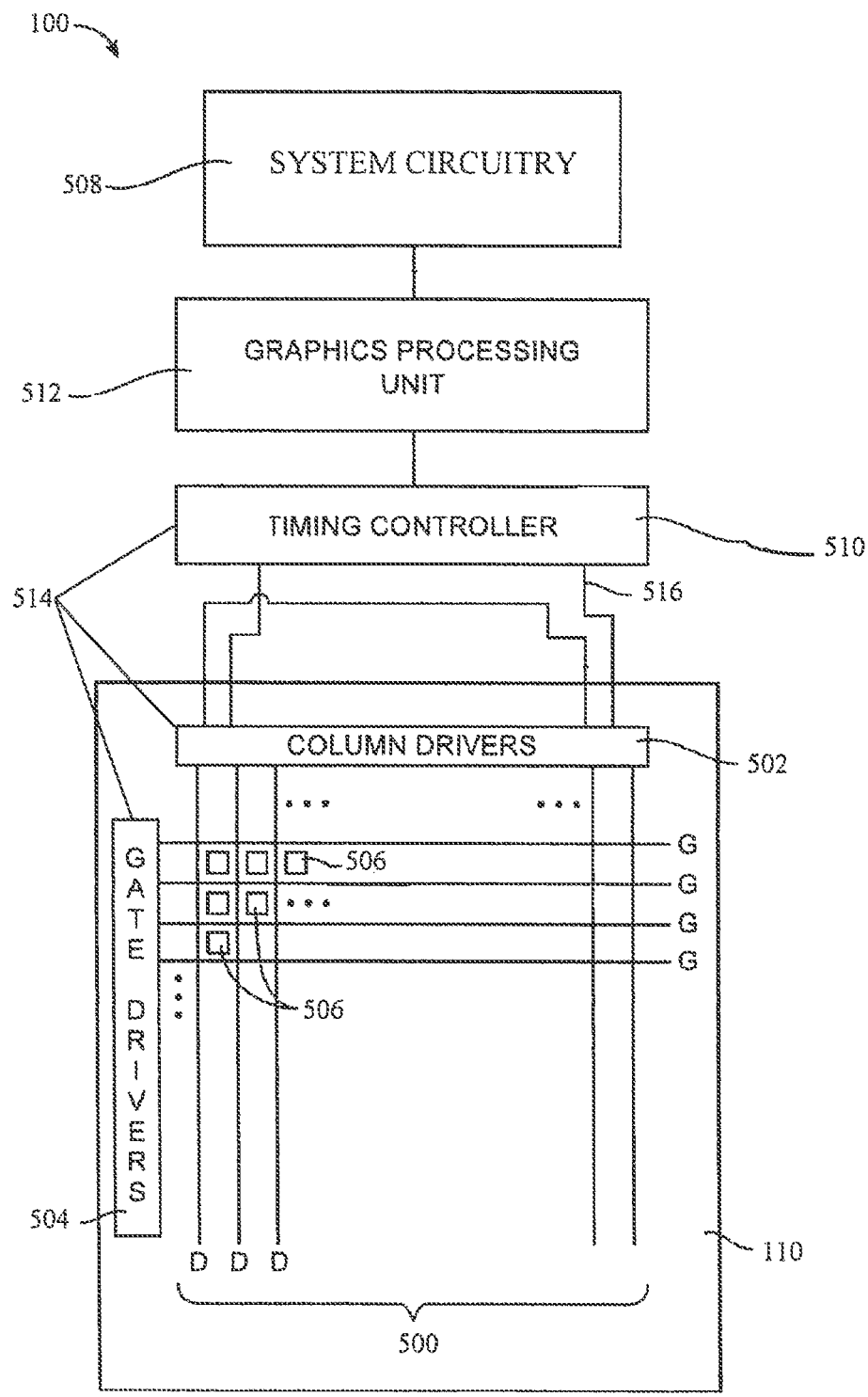
FIG. 5 illustrates a schematic diagram of an exemplary electronic device having a display in accordance with various aspects of the subject technology.

FIG. 5 is a schematic diagram of device 100 showing illustrative circuitry that may be used in displaying images for a user of device 100 on pixel array 500 of display 110. In the example of FIG. 5, display 110 includes column driver circuitry 502 that drives data signals (analog voltages) onto the data lines D of array 500. Gate driver circuitry 504 drives gate line signals onto gate lines G of array 500.

Using the data lines D and gate lines G, display pixels 506 are operated to display images on display 110 for a user. In some implementations, gate driver circuitry 504 may be implemented using thin-film transistor circuitry on a display substrate such as a glass or plastic display substrate or may be implemented using integrated circuits that are mounted on the display substrate or attached to the display substrate by a flexible printed circuit or other connecting layer. In some implementations, column driver circuitry 502 may be implemented using one or more column driver integrated circuits that are mounted on the display substrate or using column driver circuits mounted on other substrates.

Device 100 includes control circuitry. The control circuitry includes system circuitry 508 and display control circuitry such as graphics processing unit 512, and timing controller 510. During operation of device 100, system circuitry 508 produces data that is to be displayed on display 110. This display data is provided to display control circuitry such as timing controller integrated circuit 510 using graphics processing unit 512.

Timing controller 510 provides digital display data to column driver circuitry 502 using paths 516. Column driver circuitry 502 receives the digital display data from timing controller 510. Using digital-to-analog converter circuitry within column driver circuitry 502, column driver circuitry 502 provides corresponding analog output signals on the data lines D running along the columns of display pixels 506 of array 500.

Timing controller 510, column drivers 502, and gate drivers 504 may sometimes collectively be referred to herein as display control circuitry 514. Display control circuitry 514 is used in controlling the operation of display 110. Display control circuitry 514 may be implemented, in some configurations, in a common package such as a display driver, a display controller, a display driver integrated circuit (IC), or a driver IC. Graphics processing unit 512, when included in the display control circuitry, performs image or other graphics processing on display data received from system circuitry 508 prior to providing the display data to display control circuitry 514 for display using pixels 506 of array 500. Graphics processing unit 512 may be a separate processing controller from system circuitry associated with system circuitry 508 or may be implemented as a part of system circuitry 508 (e.g., in a common SOC). Although a signal gate/scan line G and a single data line D for each pixel 506 are illustrated in FIG. 5, this is merely illustrative and one or more additional row-wise and/or column-wise control lines may be coupled to each pixel 506 in various implementations.

Electromagnetic fields from interfering devices, such as magnetic fields generated by wireless charging devices, can inductively or capacitively couple to one or more of data lines D, which can cause a voltage ripple on the data lines. Voltage ripples on data lines D, interacting with data line sampling, can produce a visible artifact on display 110 such as a wavy (e.g., mura) distortion pattern or other patterned distortion effect. The distortion pattern, when generated on the display, modifies intended display frame data (e.g., display frame data provided by system circuitry 508, GPU 512, and/or display driver IC 514) in a pattern that depends on the beat frequency between the interfering device operating frequency and the display line frequency.

Figure 6:
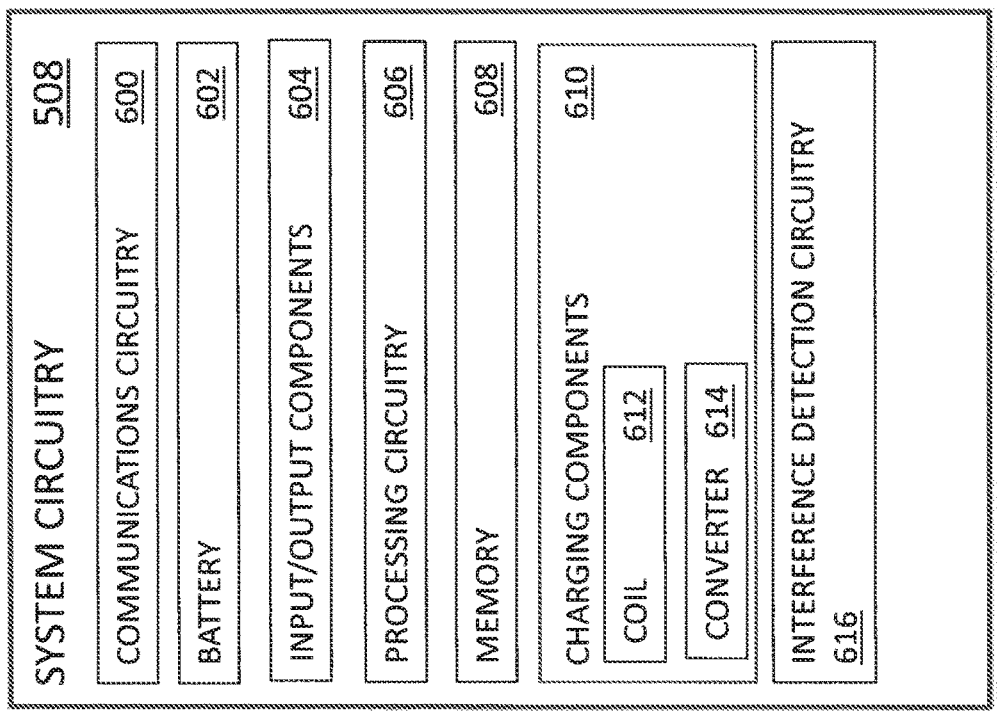
FIG. 6 illustrates a schematic diagram of exemplary system circuitry for an electronic device having a display in accordance with various aspects of the subject technology.

FIG. 6 is a schematic diagram of system circuitry 508 showing illustrative circuitry that may be used in operation of device 100. In the example of FIG. 5, system circuitry 508 includes communications circuitry 600, battery 602, input/output components 604, processing circuitry 606, memory 608, and charging components 610.

Memory 608 may include one or more different types of storage such as hard disk drive storage, nonvolatile memory (e.g., flash memory or other electrically-programmable-read-only memory), volatile memory (e.g., static or dynamic random-access-memory), magnetic or optical storage, permanent or removable storage and/or other non-transitory storage media configure to store static data, dynamic data, and/or computer readable instructions for processing circuitry in system circuitry 508. Processing circuitry 606 is used in controlling the operation of device 100. Processing circuitry 606 may sometimes be referred to herein as system circuitry or a system-on-chip (SOC) for device 100.

Processing circuitry 606 may be based on a processor such as a microprocessor and other suitable integrated circuits, multi-core processors, one or more application specific integrated circuits (ASICs) or field programmable gate arrays (FPGAs) that execute sequences of instructions or code, as examples. In one suitable arrangement, processing circuitry 606 is used to run software for device 100, such as internet browsing applications, email applications, media playback applications, operating system functions, software for capturing and processing images, software implementing functions associated with gathering and processing sensor data, software that makes adjustments to display brightness, display frame and/or line times, and touch sensor functionality, etc.

Input/output components 604 may include a touch-sensitive layer of display 110, a keyboard such as keyboard 304, a touch-pad such as touch-pad 306, and/or one or more buttons such as buttons 104, 400, and 402. In some scenarios, input/output components 604 may be interfering components for display 110 for which interference mitigation operations described herein may be performed.

Charging components 610 may be wired and/or wireless charging components. Wireless charging components may include a coil 612 configured to be inductively coupled to a coil in a wireless charger and may include conversion circuitry such as converter 614 for converting a current induced into coil 612 for charging of battery 602.

Communications circuitry 600 may be implemented using WiFi, NFC, radio, microwave, and/or other wireless and/or wired communications circuitry. Communications circuitry 600 may be operated by processing circuitry 606 based on instructions stored in memory 608 to perform cellular telephone, network data, or other communications operations for device 100. Communications circuitry 600 may include WiFi and/or NFC communications circuitry operable to communicate with an external interfering device such as a wireless charging device.

System circuitry 508 may also, optionally, include interference detection circuitry 616. Interference detection circuitry 616 may include a dedicated antenna, a probe on one or more of data lines D or gate lines G, or a probe on coil 612. Interference detection circuitry 616 may include signal processing circuitry for identifying and/or characterizing a detected interference signal. For example, the signal processing circuitry may receive a signal, generated by one or more of the dedicated antenna, the probe on one or more of data lines D or gate lines G, or the probe on coil 612 responsive to an interference signal from an interfering device. The signal processing circuitry may determine a frequency, an amplitude, and/or a phase of the interference signal based on the received signal. Once determined, the determined frequency, amplitude, and/or phase are provided to processing circuitry 606 and/or display driver IC 514. Processing circuitry 606 and/or display driver IC 514 adjust the phase of display frames of the display to prevent the identified interference signal from generating a visible artifact during operation of the display (e.g., by generating frame-by-frame phase shifts differing by 180 degrees, or random phase differences, to average out a distortion effect caused by the interference signal in any single display frame).

Interference detection circuitry 616 may include circuitry for detecting an interference signal and/or for determining the frequency, amplitude, and/or phase of the interference signal. Processing circuitry 606 and/or display driver 514 may generate a corrective action for display 110 (e.g., a display frame phase adjustment) or the interfering device based on one or more signals from interference detection circuitry 616 that indicate the determined frequency, amplitude and/or phase. For example, interference detection circuitry 616 may be provided with a frequency divider, a phase frequency detector (PFD), an integrator, and a display frame clock adjustment circuit to form a phase locked loop (PLL) that ensures that the adjustment of the display frame rate (e.g., relative phase adjustments of individual display frames) continuously counters any static or dynamic interference signal as described in further detail hereinafter in accordance with some aspects of the subject disclosure.

Figure 7:
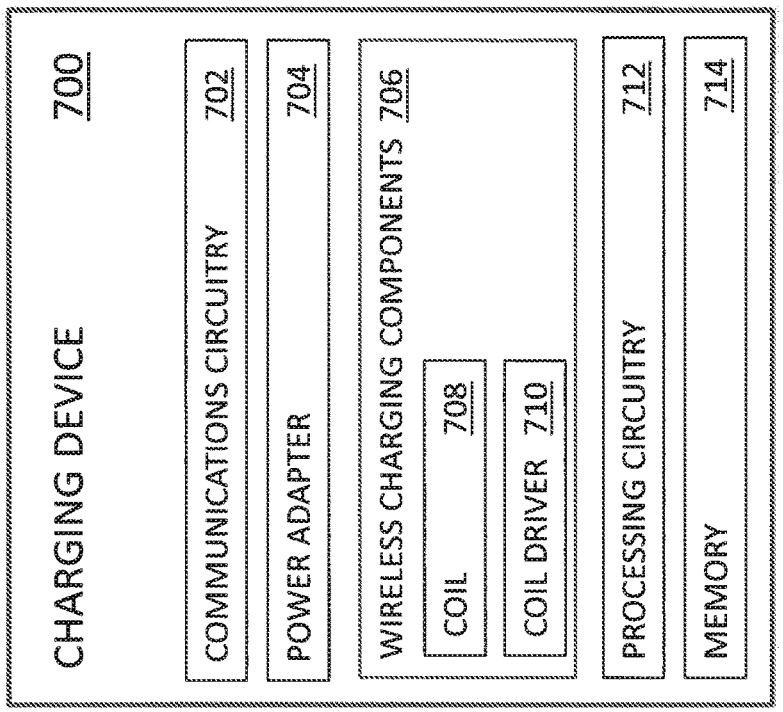
FIG. 7 illustrates a schematic diagram of an exemplary external device implemented as a charging device for an electronic device having a display in accordance with various aspects of the subject technology.

FIG. 7 is a schematic diagram of a charging device that can be used to charge battery 602 of device 100. As shown in FIG. 7, charging device 700 may be provided with communications circuitry 702. Communications circuitry 702 may include WiFi and/or NFC communications circuitry operable to communicate with communications circuitry 600 of device 100. Charging device 700 also includes power adapter 704 and wireless charging components 706 and may also include processing circuitry 712, and/or memory 714.

Power adapter 704 may be an alternating current (AC) adapter configured to receive electrical power from, for example, a wall outlet or may be a direct current (DC) adapter configured to receive power from, for example, a universal serial bus (USB) input. Power adapter 704 is arranged to couple external power to wireless charging components 706.

Memory 714 may include one or more different types of storage such as hard disk drive storage, nonvolatile memory (e.g., flash memory or other electrically-programmable-read-only memory), volatile memory (e.g., static or dynamic random-access-memory), magnetic or optical storage, permanent or removable storage and/or other non-transitory storage media configure to store static data, dynamic data, and/or computer readable instructions for processing circuitry 712. Processing circuitry 712, when included, is used in controlling the operation of charging device 700.

Processing circuitry 712 may be based on a processor such as a microprocessor and other suitable integrated circuits, multi-core processors, one or more application specific integrated circuits (ASICs) or field programmable gate arrays (FPGAs) that execute sequences of instructions or code, as examples. In one suitable arrangement, processing circuitry 712 may be operate charging device 700, such as operating communications applications for sending and/or receiving information to and/or from device 100 and/or operating wireless charging components 706.

Wireless charging components 706 may include coil 708 and coil driver 710. Coil driver 710 may receive instructions from a device controller for charging device 700 such as processing circuitry 712.

It should be appreciated that charging device 700 of FIG. 7 is merely illustrative and, in some implementations, charging device 700 may be provided with fewer components (e.g., with only a power adapter and static circuitry that provides power from the power adapter to coil 708 to provide a wireless charging signal without communications with any processing circuitry or communications circuitry).

In implementations in which charging device 700 is provided with communications circuitry 702, during charging operations in which wireless charging components 706 are operated to provide power to device 100 (e.g., via charging components 610), information associated with the operation of display 110 is provided from device 100 to charging device 700 (e.g., via a wired or wireless communication between communications circuitry 600 of device 100 and communications circuitry 702 of charging device 700). The information associated with the operation of display 110 may include information that indicates whether display 110 is in operation and/or additional information such as information indicating a frame rate, a frame time, a vertical blanking indicator, and/or a horizontal blanking indicator.

Charging device 700 may provide a charging signal to device 100 based, at least in part, on the information associated with the operation of display 110. For example, charging device 700 may provide a charging signal to device 100 only when the information associated with display 110 indicates that display 110 is not being operated. For example, when device 100 is placed within a proximity of charging device 700 (e.g., within an area of charging device 700 within which charge can be provided to device 100 from charging device 700), charging device 700 may determine whether display 110 is in operation and provide a charging signal to device 100 if it is determined that display 110 is not in operation. In another example, during charging operations, charging device 700 receives information indicating that display 110 has been activated and charging device 700 stops or modifies charging operations. For example, during operation of display 110, charging device 700 may generate a charging signal for device 100 during selected time windows, the time windows selected based on the received information associated with the operation of display 110. In another example, charging device 700 generates charging signals only during vertical blanking periods of display frames when display 110 is in operation. In another example, charging device 700 generates varying phase charging signals to mitigation interference with display 110.

In some implementations in which charging device 700 is provided with communications circuitry 702, charging device 700 provides charging information to device 100 via communications circuitry 702 and communications circuitry 600 and device 100 controls display 110 based on the received charging information (e.g., by powering down display 110 or by applying a display frame phase shift to compensate for interference effects caused by the charging operations). In other implementations, device 100 identifies charging characteristics of charging device 700 indirectly (e.g., using interference detection circuitry 616) to inform display interference mitigation/compensation operations. In other implementations, device 100 assumes the charging characteristics to inform display interference mitigation/compensation operations.

Although various examples are described herein in which an interference signal is generated by a wireless charger, this is merely illustrative. Display 110 may be operated using one or more of the methods described herein to mitigate visible artifacts during operation of display 110 caused by any additional component or device that generates an interference signal. The additional component or device may also, or alternatively, be operated using one or more of the methods described herein to mitigate visible artifacts during operation of display 110.

Figure 8:
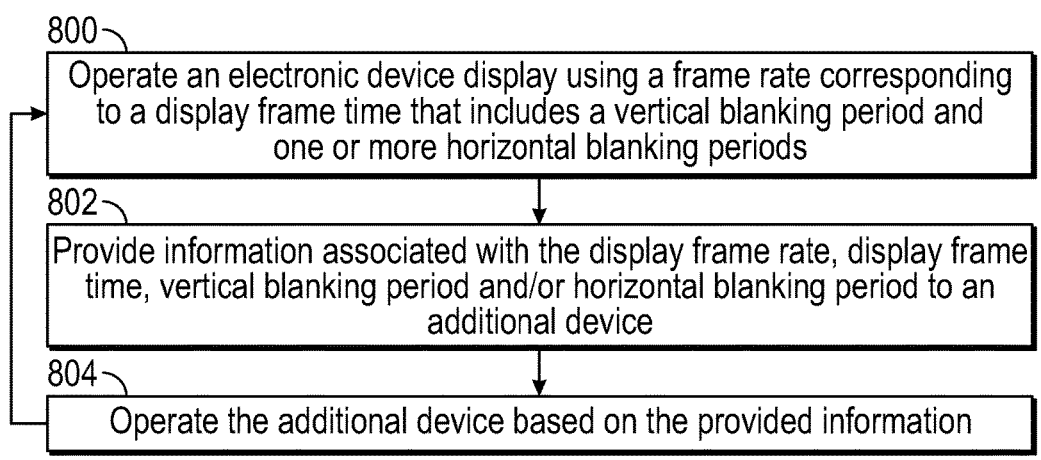
FIG. 8 illustrates a flow chart of an example process for operation of an additional device in accordance with various aspects of the subject technology.

FIG. 8 depicts a flow diagram of an example process for operation of an additional device (e.g., an additional module within an electronic device or a separate device such as a wireless charger) that generates an interference signal for an electronic device display, in accordance with various aspects of the subject technology. For explanatory purposes, the example process of FIG. 8 is described herein with reference to the components of FIGS. 1-7. Further for explanatory purposes, the blocks of the example process of FIG. 8 are described herein as occurring in series, or linearly. However, multiple blocks of the example process of FIG. 8 may occur in parallel. In addition, the blocks of the example process of FIG. 8 need not be performed in the order shown and/or one or more of the blocks of the example process of FIG. 8 need not be performed.

In the depicted example flow diagram, at block 800, an electronic device display such as display 110 of device 100 is operated using a frame rate. The frame rate corresponds to a display frame time (e.g., the display frame rate may be the inverse of the display frame time) that may include a vertical blanking period and one or more horizontal blanking periods.

At block 802, information associated with the operation of the display such as the display frame rate, display frame time, vertical blanking period and/or horizontal blanking period is provided from device 100 to the additional device. The additional device may be a touch-sensitive component, a wireless communications component, or other interfering component within device 100 or may be an external device such as a media player (e.g., a speaker system) or a charging device such as charging device 700.

At block 804, the additional device is operated based on the provided information. For example, the additional device may be operated at one or more times determined using the provided information (e.g., only during vertical blanking periods for display 110, as determined by vertical blanking or other display timing indicators provided from device 100 to the additional device). As another example, an operating frequency or an operating phase of the additional device may be modified based on the provided information. For example, charging device 700 may be operated to generate a wireless charging signal that has a varying phase that causes alternating distortion patterns in displayed content on display 110 that visually average out or cancel over the course of two or more display frames. The varying phase of the wireless charging signal may depend on the frame rate for the display.

Figure 9:
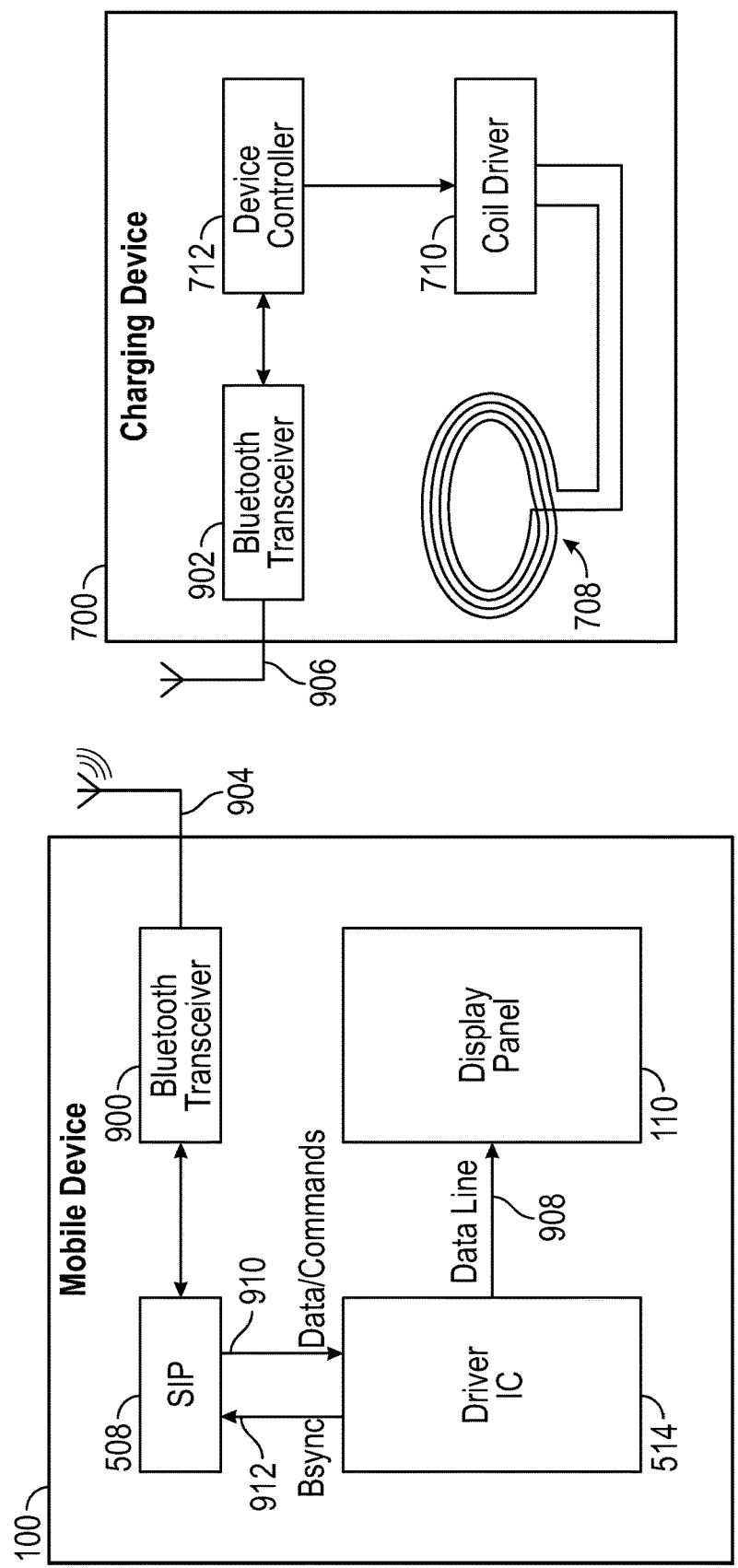
FIG. 9 illustrates a schematic diagram of an exemplary charging device in communication with an electronic device having a display in accordance with various aspects of the subject technology.

FIG. 9 shows an exemplary implementation of device 100 and the additional device, in which device 100 has been implemented as a mobile device (e.g., a cellular telephone, a tablet computer, a portable computer, or a wearable device such as a wristwatch device), the additional device has been implemented as charging device 700, and device 100 and charging device 700 have been implemented respectively with Bluetooth transceivers 900 and 902 with corresponding antennas 904 and 906. During operation of display 110, system circuitry 508 (implemented in FIG. 9 as a system in a package (SIP)) generates and provides data 910 to display driver IC 514 and receives synchronization signals 912 from display driver IC 514. Display driver IC 514 provides data line signals 908 (e.g., along data lines D of FIG. 5) to operate display panel 110.

In the example of FIG. 9, information associated with the operation of display 110 (labeled in FIG. 9 as a display panel) is generated by system circuitry 508 and transmitted from device 100 to charging device 700 using Bluetooth transceiver 900 and antenna 904. Bluetooth transceiver 902 receives the information associated with the operation of display 110 and provides the information to processing circuitry 712 (e.g., a device controller). Device controller 712 operates coil driver 710 to generate charging signals with coil 708 based on the received information (e.g., by generating the charging signals only during vertical blanking periods or by generating the charging signals with a varying phase).

Figure 10:
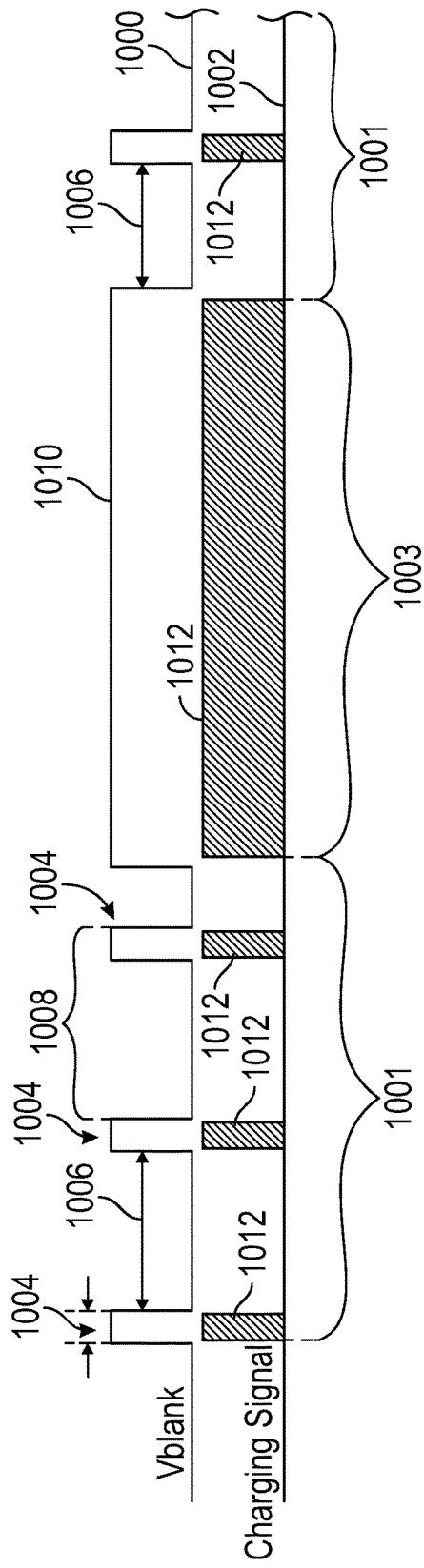
FIG. 10 illustrates an exemplary timing diagram for control of a charging device for interference mitigation for an electronic device display in accordance with various aspects of the subject technology.

FIG. 10 shows an exemplary timing diagram showing a vertical blanking timeline 1000 and an exemplary charging signal timeline 1002 in which a charging signal is generated by a charging device such as charging device 700 only during vertical blanking periods. In the example of FIG. 10, various data frame times 1008 are shown that include a data update period 1006 (e.g., an active data line updating time) and a vertical blanking period 1004. A frame time 1008 may be the inverse of the frame rate or refresh rate at which the display is being operated. Charging signal timeline 1002 shows a charging signal 1012 that is generated only during the vertical blanking periods 1004 during normal operation periods 1001 for the display. In some implementations, the frame time 1008 may be adjusted based on the content being displayed. For example, in a low refresh rate mode, indicated by time period 1003, an extended blanking period 1010 may be used when update or refresh of the display is not performed. As shown in FIG. 10, charging signal 1012 is generated continuously during the extended blanking period 1010.

The operations described above in connection with FIGS. 8-10 can be particularly useful in scenarios in which it is possible to communicate display operation information from electronic device 100 to an interfering device such as charging device 700. However, in some scenarios, third party devices or devices without communications circuitry may be used in the vicinity of electronic device 100 and can generate interference signals that can cause distortion in displayed data with display 110. In order to prevent or mitigate visible artifacts due to interference signals from devices or modules that do not communicate with device 100 and may therefore not be modified to prevent generating of the interference signals, the frame time and/or frame rate of display 110 may be adjusted.

Figure 11:
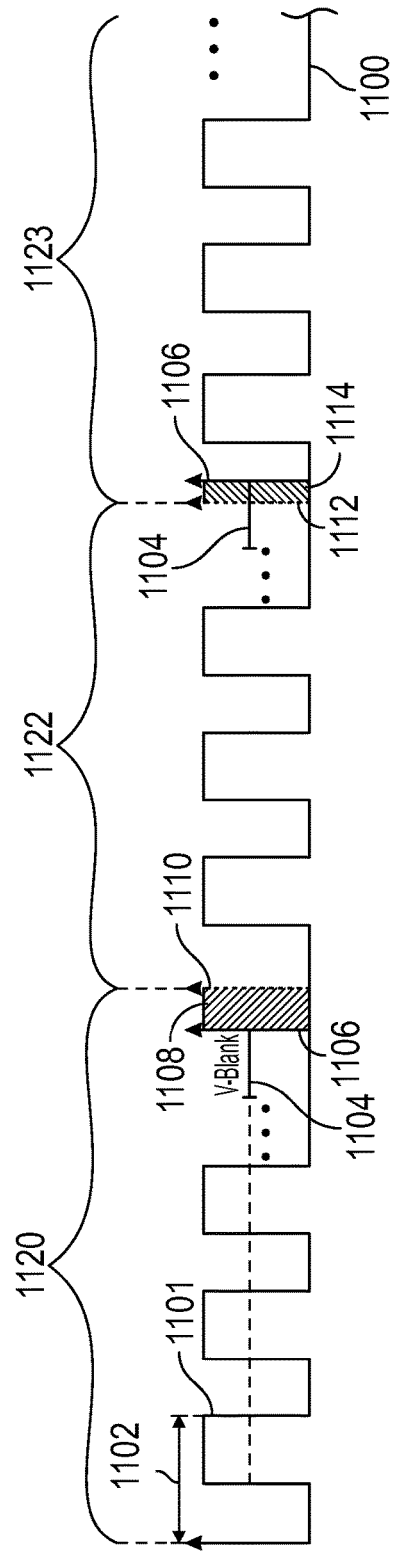
FIG. 11 illustrates an exemplary timing diagram for control of an electronic device display in accordance with various aspects of the subject technology.

FIG. 11 shows an exemplary timing diagram showing a scan signal timeline 1100 for operation of display 110. As shown in FIG. 11, scan signal timeline 1100 includes scan pulses 1101 for each pixel row in display 110 and vertical blanking periods 1104 during which no scan pulses are provided. Scan pulses 1101 are provided during a line time 1102 for each line or row of pixels in display 110. Display 110 may have a nominal frame rate. The nominal frame rate may correspond to a nominal frame time that includes a number of scan pulses corresponding to the number of display pixel rows and includes a nominal vertical blanking period. The end of the nominal vertical blanking periods in FIG. 11 are indicated by arrows 1106 for a first display frame 1120 and a second display frame 1122.

However, as shown in FIG. 11, vertical blanking period 1104 for first display frame 1120 is extended by an extension time 1108, to end at a time indicated by arrow 1110. Second display frame 1122 is reduced by a reduction time 1114 to end at a time indicated by arrow 1112. In this way, the phase of first display frame 1120 is shifted relative to the phase of second display frame 1122.

Extension time 1108 and reduction time 1114 may be equal in magnitude, such that the phase shift between first display frame 1120 and second display frame 1122 is 180 degrees in phase, or extension time 1108 and reduction time 1114 may have different magnitudes to generate another desired phase shift. In some implementations, the relative phase shifts between frames are random or pseudo-random. Third frame 1123 includes an extension time that is equal to extension time 1108 such that every other frame (e.g., first frame 1120 and third frame 1123) is in phase and intervening frames are out of phase. However it should be appreciated that various phase shifts can be applied to mitigate visible artifacts associated with various interfering signals.

In the example of FIG. 11, first display frame 1120 and third display frame 1123 have a common frame time (e.g., due to the common extension time of the vertical blanking period), and second display frame 1122 has a frame time that is different from the common frame time of first display frame 1120 and third display frame 1123 (e.g., due to reduction time 1114). Display data for display frames 1120, 1122, and 1123 may be provided (e.g., by system circuitry 508) having a nominal frame time that includes the nominal vertical blanking periods 1104. However, system circuitry 508 or display driver IC 514 generates display timing signals that cause the actual frame times for display frames 1120, 1122, and 1123 to be different from the nominal frame times by amounts equal to the extension times and reduction times as described. Although only three frames are shown in FIG. 11, it should be appreciated that the modifications to the frame times described in connection with FIG. 11 can be applied to any or all display frames during operation of display 110.

Extension time 1108 and reduction time 1114 may be substantially shorter than the inverse of the frequency of the interference signal. Accordingly, each displayed frame may include a distortion pattern caused by an interference signal. However, changes in the distortion pattern in each displayed frame, the changes caused by the changes in display frame phase, are different such that, to the human eye, the distortion patterns average or cancel and are not visible. For example, in an implementation in which the phase of first and third display frames 1120 and 1123 are 180 degrees out of phase with second display frame 1122 (e.g., if the magnitudes of times 11108 and 1114 are equal) second display frame 1122 includes a distortion pattern that is equal and opposite to the distortion pattern of first and third display frames 1120 and 1123. It should be appreciated that the distortion patterns caused by the interference signal are superposed onto display data for the first, second, and third data frames that does not include the distortion pattern (or the equal and opposite distortion pattern).

In some implementations, the frame time of second display frame 1122 is shorter than the nominal frame time of second display frame 1122 by first amount of time (e.g., reduction time 1114) and the common frame time of first and third display frames 1120 and 1123 is longer than the nominal frame time by a second amount of time (e.g., extension time 1108).

Although the timeline of FIG. 11 shows frame adjustment times 1108 and 1114 occurring during the vertical blanking period, it should be appreciated that, in other implementations, frame adjustment times 1108 and 1114 may be divided amongst the line times 1102 of each frame (e.g., with increased line times for first and third frames 1120 and 1123 and reduced line times for second frame 1122) to accumulate overall frame adjustment times 1108 and 1114 throughout the frames.

Figure 12:
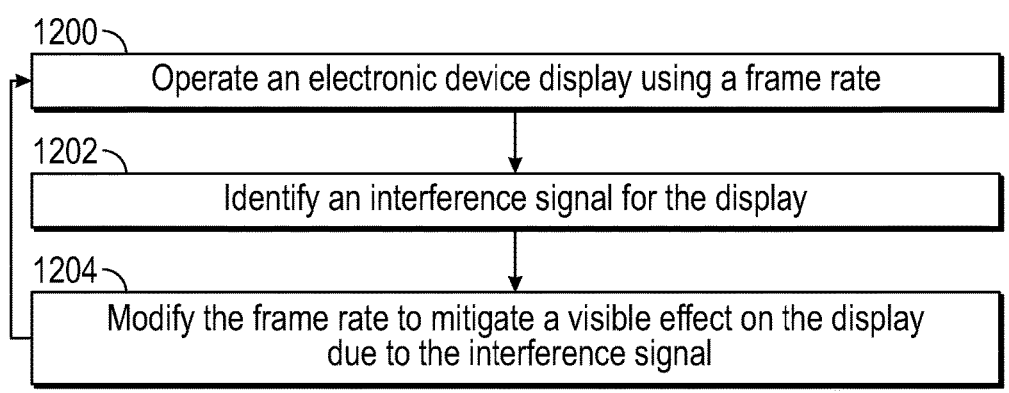
FIG. 12 illustrates a flow chart of an example process for operation of an electronic device display in accordance with various aspects of the subject technology.

FIG. 12 depicts a flow diagram of an example process for operation of an electronic device display in accordance with various aspects of the subject technology. For explanatory purposes, the example process of FIG. 12 is described herein with reference to the components of FIGS. 1-7. Further for explanatory purposes, the blocks of the example process of FIG. 12 are described herein as occurring in series, or linearly. However, multiple blocks of the example process of FIG. 12 may occur in parallel. In addition, the blocks of the example process of FIG. 12 need not be performed in the order shown and/or one or more of the blocks of the example process of FIG. 12 need not be performed.

In the depicted example flow diagram, at block 1200, an electronic device display such as display 110 of device 100 is operated using a frame rate such as a nominal frame rate for the display. The nominal frame rate may be a default frame rate for the display or may be a nominal frame rate that is determined based on a mode of operation of the display or content being displayed on the display (e.g., a relatively fast nominal frame rate for dynamic display content such as video content or a relatively slow nominal frame rate for static display content such as static image and/or text content). The nominal frame rate may be a frame rate in which the frame time of each display frame is the same.

At block 1202, an interference signal for the display is identified. The interference signal is identified using interference detection circuitry 616, communications circuitry 600, and/or charging components 610. In some implementations, identifying the interference signal includes active detection of the interference signal using an antenna that receives the interference signal, using a probe on a data line or other circuit component of display 110, or using a probe on a wireless charging component such as coil 612 (as examples).

In some implementations, identifying the interference signal includes passive identification of the interference signal. For example, passive identification of an interference signal may include identifying that wireless charging is taking place, identifying that wireless charging is taking place and identifying a known charging signal frequency for an identified charging device, or merely identifying that the device having the display is wireless charging enabled and that a wireless charging signal may be present.

In some implementations, passive and active identification of the interference signal may both be performed. Identification of the interference signal may be performed upon powering-up the electronic device, upon activation of some or all of the electronic device display, periodically during operation of the device and/or operation of the display, upon detection of the interference signal, and/or continuously during operation of the device and/or the display.

At block 1204, the frame rate of the display is modified (e.g., to mitigate a visible effect on the display due to the interference signal). Modifying the frame rate includes modifying the frame times of individual display frames by modifying the vertical blanking period of the individual display frames (e.g., as described above in connection with FIG. 11) or by modifying the horizontal blanking periods of the individual display frames. Modifying the horizontal blanking periods of the individual display frames includes increasing or decreasing one or more horizontal blanking periods within each display frame to generate an overall increase or decrease of the frame time of that display frame.

In some implementations, modifying the frame rate includes alternately increasing and decreasing the frame times of alternating frames such that the overall frame rate remains the same as the nominal frame rate while the phase of the individual display frames is alternated with a 180 degree phase shift. More generally, the phase of the operating frequency of the display is adjusted, based on an identified interference signal, by operating the display to display frames with an overall frame rate within which each of the display frames is phase shifted relative to at least another of the display frames. For example, each of the display frames may be phase shifted by 180 degrees relative to an adjacent one of the plurality of display frames. Modifying the frame rate may include increasing and/or decreasing the frame times of various display frames randomly, pseudo-randomly, according to a predetermined phase modification pattern, or responsive to identified features of the interference signal (e.g., the frequency of the interference signal) such that the overall frame rate remains the same as the nominal frame rate while the phase of the individual display frames is varied to average out or smear any distortion pattern that may appear in any individual display frame.

Figure 13:
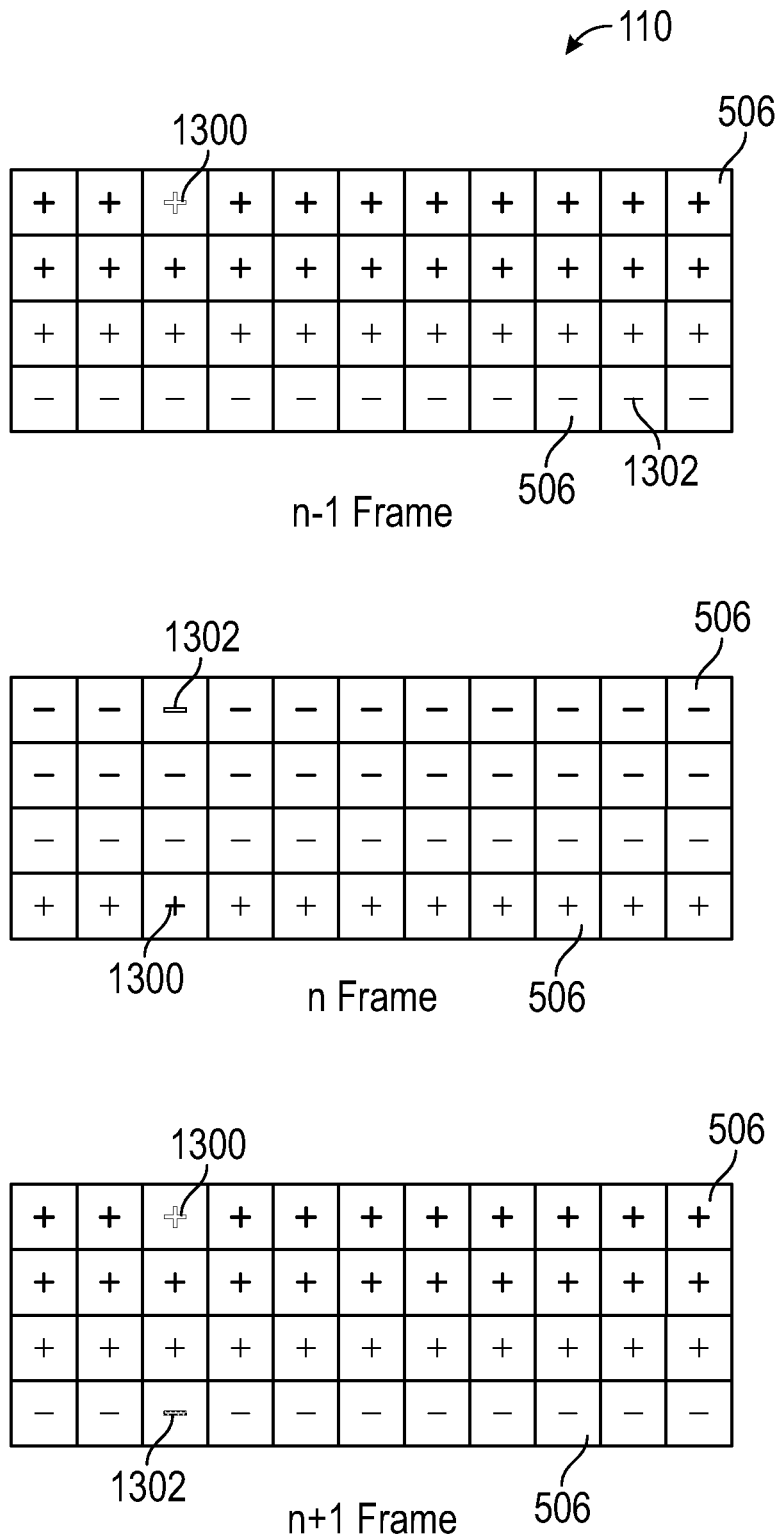
FIG. 13 illustrates schematic diagrams of various display frames during operation of an electronic device display in accordance with various aspects of the subject technology.

FIG. 13 shows exemplary distortion patterns that appear in individual display frames during operation of display 110 using a 180 degree display frame phase shifting operation in the presence of an interference signal. As shown in FIG. 13, a first display frame n−1 includes a distortion pattern. The distortion pattern may include positive distortions 1300 (e.g., brightness increases above a desired pixel brightness) and/or negative distortions 1302 (e.g., brightness increases above a desired pixel brightness) in various display pixels 506. The distortion pattern is caused by an interference signal (e.g., a wireless charging signal or other interference signal generated by another internal component or an external device and inductively or capacitively coupled to the display circuitry). The thickness of the "+" and "−" symbols each pixel 506 in FIG. 13 indicates the magnitude of the distortion pattern in that pixel.

Subsequent second and third frames n and n+1, to be displayed consecutively following frame n using display 110, are also shown in FIG. 13, each having a distortion pattern that includes positive distortions 1300 and negative distortions 1302. However, because the phase of frame n−1 is 180 degrees out of phase with frames n and n+1, the distortion pattern in frame n is a compensation distortion pattern that is substantially equal and opposite to the distortion patterns in first and third frames n−1 and n+1.

Because the overall frame rate at which display frames n−1, n, and n+1 of FIG. 13 are displayed is faster than the refresh rate of the human eye, the distortion patterns of, for example, frames n−1 and n cancels or averages out before a user can visibly identify the pattern in any individual frame. In this way, the visible effect of any distortion pattern caused by any interference signal can be mitigated or eliminated, even in circumstances in which the properties of the interference signal are not known or the interference signal has not been identified.

As illustrated by FIGS. 11, 12, and 13, control circuitry such as system circuitry 508 of an electronic device operates a display such as display 110 to provide display frames such as display frames n−1, n, and n+1. The control circuitry also identifies an interference signal for the display. The interference signal is associated with an additional device. The additional device may be a wireless charger such as wireless charger 700 and the interference signal may be a portion of a wireless charging signal from the wireless charger that charges a battery or otherwise provides power to device 100. The control circuitry adjusts a phase of each of display frames n−1, n, and n+1 (which may correspond to display frames 1120, 1122, and 1123 of FIG. 11), based on the identified interference signal, to generate changing distortion patterns in the display frames such as the distortion patterns of FIG. 13. As shown in FIG. 13, the changing distortion patterns in display frames n−1, n, and n+1 are configured (e.g., by the phase adjustments) to combine to prevent a visible effect, on the display, of the interference signal.

Display frames such as display frames n−1, n, and n+1 may be displayed with an overall frame rate. A phase shift applied to each of the display frames relative to at least another of the display frames adjusts the phase while maintaining the overall frame rate.

It should be appreciated that the distortion patterns shown frames n−1, n, and n+1 of FIG. 13 may be superposed onto desired display frame data (e.g., an image, text, video frame, or other content generated for display for a user). Although a 180 degree phase shift operation is illustrated in FIG. 13, it should be appreciated that this is merely illustrative and, in other implementations, the phase of various display frames may be varied more slowly such that the averaging or smearing of the distortion patterns in various display frames occurs over more than two frames.

Modifying the phase of individual display frames relative to other display frames may be performed to prevent or mitigate visual artifacts caused by known, expected, unknown, or unexpected interference signals. In circumstances in which properties of the interference signal are known or can be determined, display frame phase shifting operations may include active tuning of the phase shifting to compensate for a specific interference signal.

Figure 14:
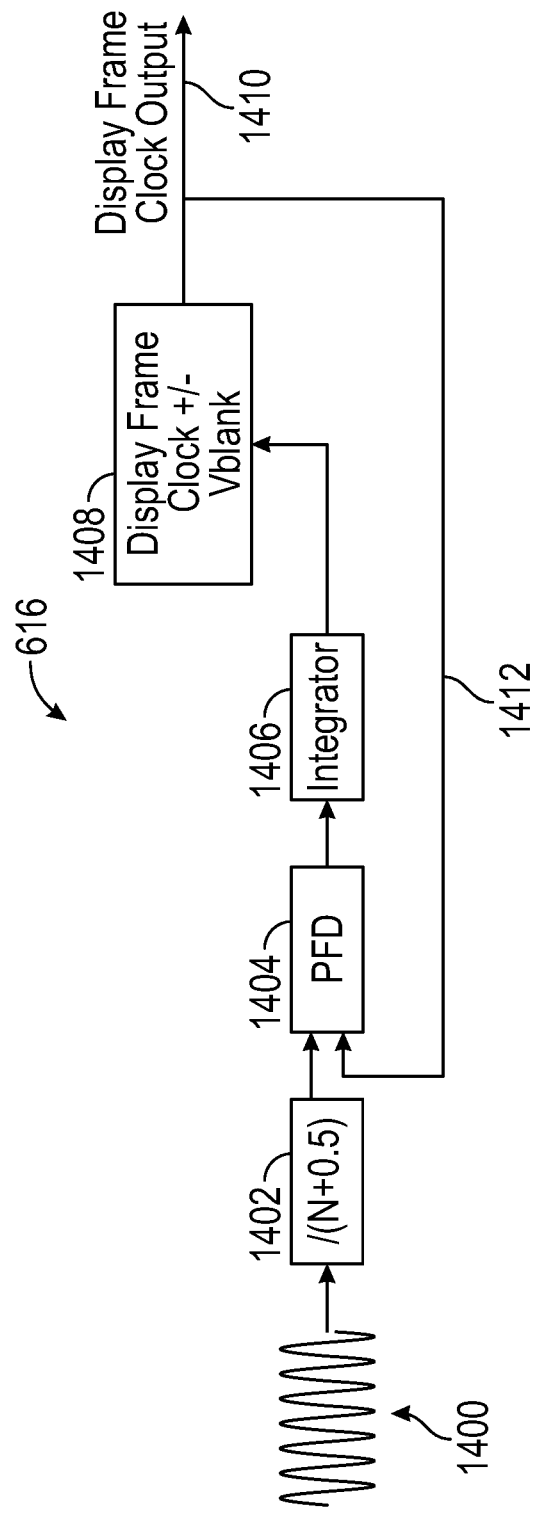
FIG. 14 illustrates a schematic diagram of a system for active frame-phase tuning for an electronic device display in accordance with various aspects of the subject technology.

FIG. 14 shows an exemplary implementation of interference detection circuitry 616 in a configuration in which active tuning of display frame phase shifting is performed. As shown in FIG. 14, in some implementations, interference detection circuitry 616 includes frequency divider 1402, phase frequency detector 1404, and integrator 1406 coupled to display frame clock 1408 (e.g., formed as a portion of timing controller 510).

In the configuration of FIG. 14, noise waveform 1400 (e.g., a waveform corresponding to an interference signal detected by an antenna, a probe on a data line, or a probe on a charging coil as described herein) is coupled to frequency divider 1402. Frequency divider 1402 scales the frequency of waveform 1400 (sometimes referred to herein as a noise frequency, noise_freq) by a factor of N+0.5, wherein N is an integer (e.g., an integer equal to the number of lines or pixel rows in display 110 or another suitable integer). Phase frequency detector 1504 compares an output 1410 of display frame clock 1408 with the output (e.g., noise_freq/(N+0.5)) of frequency divider 1402. Integrator 1406 integrates the compared difference and provides the integrated difference to display frame clock 1408 to control the frame time of each display frame (e.g., by increasing or decreasing the vertical blanking period).

In this way, a phase lock may be achieved between the interference signal and the display frame phase adjustments such that, when the lock is achieved, the frame frequency frame_freq is equal to noise_freq/(N+0.5) so that the noise error, or distortion pattern, in the display frames is maintained with equal magnitude and opposite sign in alternating frames, independent of any variation (e.g., phase, voltage, and/or temperature variations) in the interference signal.

Although the examples of FIGS. 12-15 are described in the context of display frame phase modifications that generate alternating distortion patterns that are cancelled or averaged out visibly for a user, it should be appreciated that, in circumstances in which modification of an interfering device is possible, the desired effect of alternating distortion patterns can be achieved by performing phase adjustment operations for the interfering device (e.g., as described above in connection with FIG. 10). Phase adjustment operations for the interfering device may include operating the interfering device with a first interfering signal phase during a first frame and second, and a different interfering phase during a subsequent display frame for the electronic device display. The differing phases of operation for the interfering device may be determined based on information associated with the operation of the display of the electronic device, as received from the electronic device.

Various systems and methods have been described herein for modifying operation a display of an electronic device, and/or modifying operation of an additional device or component of the electronic device, to mitigate visible artifacts on the display caused by interference from the additional device or component. Although implementations have been described separately in some instances in which (i) the electronic device communicates display information to the additional device or component for modification of the operation of the additional device or component, (ii) display phase modification operations are performed without active tuning, and (iii) display phase modification operations are performed with active tuning, it should be appreciated that an electronic device having a display may be provided with any or all of these capabilities (i), (ii), and/or (iii) alone or in any combination as desired.

In accordance with various aspects of the subject disclosure, an electronic device is provided that includes a display. The electronic device also includes control circuitry configured to: operate the display to display first, second, and third consecutive display frames. The first display frame and the third display frame have common frame time. The second display frame has a frame time that is different from the common frame time of the first display frame and the third display frame.

In accordance with other aspects of the subject disclosure, a method is provided that includes operating an electronic device display to display first, second, and third consecutive display frames. The first display frame and the third display frame have common a frame time and the second display frame has a frame time that is different from the common frame time of the first display frame and the third display frame.

In accordance with other aspects of the subject disclosure, a method is provided that includes identifying an interference signal for an electronic device having a display, the interference signal associated with an additional device, and adjusting a phase of an operating frequency of the display or the additional device based on the identified interference signal.

In accordance with other aspects of the subject disclosure, a wireless charging device is provided that includes wireless charging components configured to provide a wireless charging signal to an electronic device, communications circuitry configured to be communicatively coupled to communications circuitry of the electronic device, and processing circuitry. The processing circuitry is configured to receive, via the communications circuitry of the wireless charging device, information associated with operation of a display of the electronic device, and operate the wireless charging components to provide the wireless charging signal to the electronic device, at least in part based on the received information.

In accordance with other aspects of the subject disclosure, an electronic device is provided that includes a display and control circuitry. The control circuitry is configured to operate the display to display a plurality of display frames. The control circuitry is also configured to identify an interference signal for the display, the interference signal associated with an additional device. The control circuitry is also configured to adjust a phase of each of the plurality of display frames, based on the identified interference signal, to generate changing distortion patterns in the plurality of display frames. The changing distortion patterns in the plurality of display frames are configured to combine to prevent a visible effect, on the display, of the interference signal.

Various functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "processor", and "memory" all refer to electronic or other technological devices. These terms exclude people or groups of people. For the purposes of the specification, the terms "display" or "displaying" means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device as described herein for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Some of the blocks may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "example" is not necessarily to be construed as preferred or advantageous over other aspects or design.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:
1. An electronic device, comprising:
a display; and
control circuitry configured to:
 operate the display to display first, second, and third consecutive display frames,
 wherein the first display frame and the third display frame have common frame time,
 wherein the second display frame has a frame time that is different from the common frame time of the first display frame and the third display frame, and
 wherein the frame time of the second display frame is configured to generate a compensation distortion pattern in the second display frame to compensate for a distortion pattern in the first and third display frames, the distortion pattern and the compensation distortion pattern caused by an interference signal.

2. The electronic device of claim 1, further comprising a battery, wherein the control circuitry is further configured to receive a wireless charging signal from a wireless charger for charging the battery, and wherein the interference signal is associated with the wireless charging signal.

3. The electronic device of claim 2, wherein the display comprises at least one data line coupled to a plurality of display pixels and wherein the interference signal comprises a portion of the wireless charging signal inductively coupled to the at least one data line.

4. The electronic device of claim 1, wherein the common frame time of each of the first and third display frames comprises a vertical blanking period that is longer than a vertical blanking period of the second display frame.

5. The electronic device of claim 1, wherein the first and third display frames each have a line time that is longer than a line time of the second display frame.

6. A method, comprising:
operating an electronic device display to display first, second, and third consecutive display frames,
wherein the first display frame and the third display frame have common frame time,
wherein the second display frame has a frame time that is different from the common frame time of the first display frame and the third display frame,
wherein the first and third display frames include a distortion pattern caused by an interference signal, and
wherein the second display frame includes a distortion pattern that is equal and opposite to the distortion pattern of the first and third display frames.

7. The method of claim 6, wherein operating the electronic device display comprises providing, from display control circuitry to an array of display pixels, display data for the first, second, and third display frames that does not include the distortion pattern or the equal and opposite distortion pattern.

8. The method of claim 7, wherein providing the display data comprises providing the display data with a nominal frame time, wherein the common frame time of the first and third display frames is different from the nominal frame time.

9. The method of claim 8, wherein the frame time of the second display frame is different from the nominal frame time.

10. The method of claim 9, wherein the frame time of the second display frame is shorter than the nominal frame time by a first amount of time and the common frame time of the first and third display frames is longer than the nominal frame time by a second amount of time.

11. The method of claim 10, wherein the first amount of time is equal to the second amount of time.

* * * * *